United States Patent [19]
Villar Otero

[11] Patent Number: 5,678,475
[45] Date of Patent: Oct. 21, 1997

[54] DISMOUNTABLE MOLD FOR TARTS AND SIMILAR ARTICLES

[75] Inventor: Domingo Villar Otero, Vigo, Spain

[73] Assignee: Plasticos de Galicia, S.A., Vigo, Spain

[21] Appl. No.: 636,833

[22] Filed: Apr. 23, 1996

[30] Foreign Application Priority Data

Mar. 7, 1996 [ES] Spain ..................... 9600606

[51] Int. Cl.⁶ .................. A47J 43/20; A21B 3/13
[52] U.S. Cl. .............. 99/432; 99/449; 99/DIG. 15; 249/DIG. 1
[58] Field of Search ............... 99/432, 442, 439, 99/428, 449, DIG. 15; 249/136, 170, DIG. 1, 117; 220/912, 625

[56] References Cited

U.S. PATENT DOCUMENTS 2,135,813  11/1938  Hartman ..................... 220/625 X
4,644,858   2/1987  Liotto et al. ............. 99/DIG. 15 X

FOREIGN PATENT DOCUMENTS 2574627  6/1986  France.

OTHER PUBLICATIONS

"Kreamerware" brouchure p. 41, from Catolog No. 12, A. Kreamer, Inc. 1936.

Primary Examiner—Reginald Alexander
Attorney, Agent, or Firm—Bucknam and Archer

[57] ABSTRACT

The dismountable mold of the present invention is constituted by a circular base with a predetermined height, the lateral wall of which is provided with a circumferential peripheral groove, and a flexible strip constituting the lateral wall of the mold, said strip being provided with a longitudinal rib near its lower edge, said rib being provided for its housing in the mentioned circumferential groove in the base. Said flexible strip has both ends shaped for their mutual locking, by the introduction of one end through an opening provided in the opposite end and by housing a projection as a wedge provided at one end, within a hole provided at the other end.

2 Claims, 1 Drawing Sheet

5,678,475

1

DISMOUNTABLE MOLD FOR TARTS AND SIMILAR ARTICLES

OBJECT OF THE INVENTION

The present invention is referred to a dismountable mold specially indicated for preparation of tarts and similar, which provides essential characteristics of novelty and notable advantages with respect to those means known and used for this same purpose in the current state of the art.

In a more concrete way, the present invention provides a mold for preparation of tarts, which is of simple manufacture, easy to use and particularly indicated for its utilization within a microwave oven, since it will be preferably produced with a material capable of being submitted to the radiation of the microwaves energy, such as for example a plastic material with a predetermined degree of stiffness. In order to achieve this purpose, the inventor has developed a mold formed by two separate pieces and both susceptible of being joined and secured together in a removable manner by using fastener means provided in one of such pieces. The device obtained can be placed within an oven containing the different components necessary for obtaining the final tart, as desired.

The field of application of the present invention is comprised within the industry devoted to the manufacture of articles for household equipments, specially of those articles conceived to be used within a microwave oven.

SUMMARY OF THE INVENTION

As mentioned hereinabove, the present invention has as its main objective, the fact of developing a dismountable mold that may be specially applicable to the preparation or tarts and similar within a microwave oven, which being or simple conception will permit, at the same time, an easy assembly/disassembly and a comfortable manipulation for the user. In this sense, the mold of the invention has two pieces removably coupled, a base and a flexible strip constituting the lateral wall of the mold, from where the mentioned base is flat, with a predetermined height, and having a lateral wall provided with a circumferential peripheral groove. At same time, the said flexible strip constituting the lateral wall in the dismountable mold has also a generally flat shape, is opened and provided on both ends with particular holding and/or closing means permitting the mutual locking of said ends (and therefore the complete formation) when the mold is operative and its subsequent removal for taking the tart away from the mold, once prepared. This flexible strip has on its internal face, a rib which extends to its entire length, located close to its lower edge and arranged to be housed in the cited circumferential peripheral groove in the external wall of said base.

The holding and closing means in the flexible strip are formed, as said above, on both ends of said strip and such that a transverse opening has been formed in one of said ends in which the opposite end shaped in a complementary manner, can be housed. One of the ends is projected away in the form of a wedge susceptible of being housed by simple pressure in a hole provided on the opposite end in a corresponding manner, thereby reaching the relative fixing of one end with respect to the other. Furthermore, it has been foreseen that both ends incorporate final portions which are outwardly bent, intended for facilitating to the user the fastening and releasing operations of the flexible strip.

BRIEF DESCRIPTION OF DRAWINGS

The following detailed description of the object of the present invention will be made on the basis of the accompanying drawings, in which a preferred embodiment has been shown in an exemplary and non limitative way. In such drawings.

Figure 2:
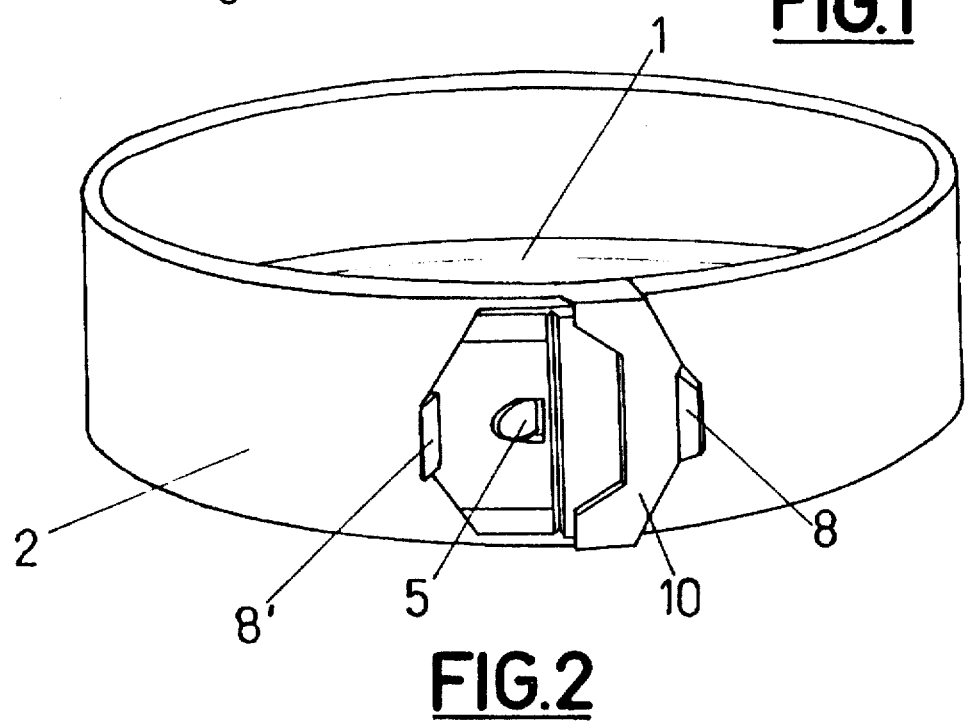

The FIG. 2 shows a perspective view of the mold duly assembled.

DESCRIPTION OF THE PREFERRED EMBODIMENT

Figure 1:
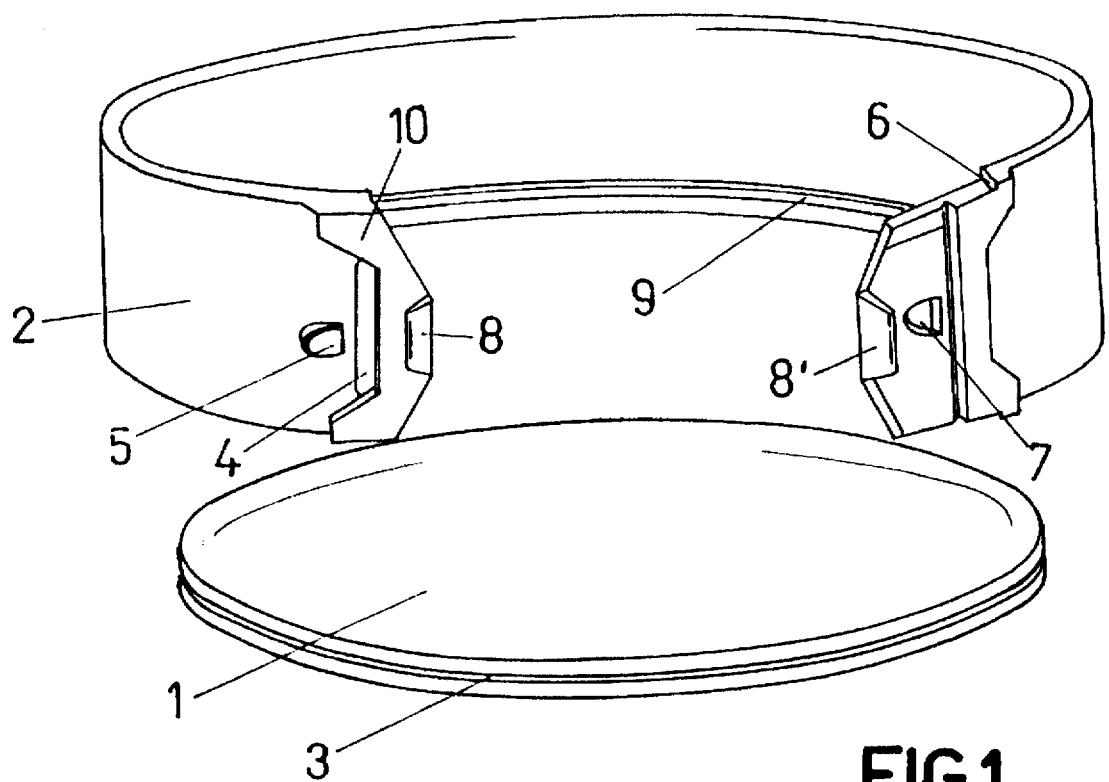
FIG. 1 is a perspective view of the mold of the invention depicted with both pieces, base and flexible strip, separated.

In order to carry out the detailed description of the preferred embodiment of the present invention, a reference to the attached drawings will be made. Thus, firstly attending to FIG. 1, a perspective view or the mold of the invention can be observed, according to which the mold is constituted by a base (1) and a flexible strip (2) or lateral wall of the mold. Said base (1) is, preferably, circular in plan, with small height but sufficient to determine an outer wall in which a circumferential peripheral groove (3) has been provided.

At the same time, the mentioned flexible strip (2) is opened and presents both ends prepared for its mutual removable joining, whereby one of the ends presents a transverse opening (4) through which the opposite end can pass, and near said opening, has a projection (5) in the form of a wedge extending to the outside. The mentioned opposite end is shaped such that presents an internal shoulder (6) constituting the limit for the coupling of both ends, and having in addition a through hole (7) in a location corresponding to that of the tab (5) in the first end. On the other hand, both ends present final portions (8, 8') extended toward the outside. Finally, the mentioned flexible strip (2) is provided on its internal face with a rib (9) which longitudinally extends along the same close to its lower edge.

In FIG. 2 of drawings appears the dismountable mold of the present invention in accordance with its operative position, that is to say, duly assembled and prepared to receive in the interior the necessary components for the preparation of a tart. To accomplish such construction, both ends of the flexible strip (2) constituting the lateral wall of the mold are firstly linked, by introducing one end and its associated portion (8')through the opening (4) in the other end, but without still accomplishing the final fixing between both ends. In these conditions, the flexible strip (2) is fitted to the base (1), by housing the rib (9) within the peripheral groove (3) in the base. Then, the definitive fixing of both ends of the flexible strip (2) can be made, by separating the respective final portions (8, 8') until the projection (5) in the first end coincides with the hole (7) in the opposite end, both being fastened by simple pressure. As can be appreciated from this Figure, the shoulder (6) in the second end remains supported against the upper and lower edges of the section (10) in the first end which is slightly raised with respect to the plane of the strip, for the formation of the opening (4) for passing the final portion (8') and the second end associated thereof. In these conditions, the flexible strip (2) will remain conveniently held to the base (1) and the mold duly assembled and prepared to be introduced within a microwave oven for the subsequent preparation of a tart. The handling of the device can be accomplished in an easy and comfortable way, by holding it simply in a manual way through the external part of the proper strip (2), now constituted as the lateral wall of the mold.

For disassembling the mold and subsequent releasing of the flexible strip (2) and the successive taking away of the finished tart, it is operated in the inverse manner, that is to say, raising the corresponding end until the projection (5) is removed from the interior of the orifice (7), by using for that the final portion (8'), and separating apart both ends or such strip. As will be appreciated, once said flexible strip (2) has been withdrawn from the base (1), the product remains perfectly within the reach of the user along all its contour and the base (1) being even able to be used as a service support for the tart placed on the same, if desired.

It is not considered necessary to make more detailed the content of the present description so that a skilled in the art could understand its scope and those advantages inherent to the same.

Nevertheless, and since the above description is referred to a preferred embodiment of the present invention, it may be submitted to multiple variations without altering with that its scope, which variations can affect to the shape, size and/or material in which the present object is manufactured.

I claim:

1. Dismountable mold for tarts and similar articles for utilization within a microwave oven, constituted from a base (1), a one-piece flexible strip (2) constituting the lateral wall of the mold and removably linked to said base, said base being circular and having a predetermined height to form an outer wall having a circumferential peripheral groove (3), said flexible strip constituting the lateral wall of said mold having on its internal face, near its lower edge, a rib (9) which longitudinally extends throughout the same and is housed in said peripheral groove (3) in the outer wall of the base when the mold is assembled, said flexible strip (2) having at a first end thereof a tab (5) and in the opposite second end thereof a through-hole (7) in a location corresponding to said tab (5) whereby when the mold is assembled, said tab (5) engages with pressure within said through-hole, said flexible strip having at the first end thereof an opening (4), the ends of said flexible strip (8,8') being introduced into said opening when the mold is assembled.

2. The mold according to claim 1 wherein said flexible strip (2) has an upper edge and has a shoulder (6) in said second end thereof, said shoulder (6) being located at said upper edge, said flexible strip (2) having a raised section (10) in said first end, said raised portion (10) having upper and lower edges and when the mold is assembled, said shoulder is supported against said upper and lower edges of said raised portion (10).

* * * * *